United States Patent [19]
Atwell et al.

[11] Patent Number: 5,167,881
[45] Date of Patent: Dec. 1, 1992

[54] PREPARATION OF SUBSTANTIALLY POLYCRYSTALLINE SILICON CARBIDE FIBERS FROM POLYORGANOSILOXANES

[75] Inventors: William H. Atwell, Midland; Duane R. Bujalski, Bay City; Eric J. Joffre, Midland; Gary E. LeGrow, Midland; Jonathan Lipowitz, Midland; James A. Rabe, Midland, all of Mich.

[73] Assignee: The Dow Corning Corporation, Midland, Mich.

[21] Appl. No.: 649,315

[22] Filed: Jan. 31, 1991

Related U.S. Application Data

[63] Continuation of Ser. No. 449,709, Dec. 12, 1989, abandoned.

[51] Int. Cl.$^5$ ............................................. D01F 9/10
[52] U.S. Cl. ....................................... 264/22; 264/25; 264/29.2; 264/29.6; 264/56; 264/83; 264/184; 264/205; 264/211.15; 264/211.16; 264/211.17; 501/95
[58] Field of Search ................. 264/56, 29.2, 82, 83, 264/22, 25, 29.6, 184, 205, 211.15, 211.16, 211.17; 501/95

[56] References Cited

U.S. PATENT DOCUMENTS

| | | | |
|---|---|---|---|
| 3,971,840 | 7/1976 | Economy et al. | 264/231 |
| 4,424,145 | 1/1984 | Sara | 264/29.2 |
| 4,904,424 | 2/1990 | Johnson | 264/29.2 |

FOREIGN PATENT DOCUMENTS 7077230 10/1980 Japan.
57-77320 5/1982 Japan.

Primary Examiner—Hubert C. Lorin
Attorney, Agent, or Firm—Killworth, Gottman, Hagan & Schaeff

[57] ABSTRACT

A process for the preparation of substantially polycrystalline silicon carbide fibers are provided. The fibers may be fabricated to have a small diameter and are thermally stable at high temperature. The process is carried out by initially forming fibers from a preceramic polymeric precursor comprising phenyl-containing polyorganosiloxane resins. The fibers are then infusibilized to render them nonmelting followed by a pyrolysis step in which the fibers are heated to a temperature in excess of 1600° C. in a nonoxidizing atmosphere to form substantially polycrystalline silicon carbide fibers. The substantially polycrystalline silicon carbide fibers which are formed have at least 75% crystallinity and have a density of at least about 2.9 gm/cm$^3$. The polymeric precursor or the fibers contain, or have incorporated therein, at least about 0.2% by weight boron. This incorporation of boron may be accomplished either prior to or during formation of the fibers or during at least one of the infusibilizing or pyrolyzing steps of the process.

40 Claims, 1 Drawing Sheet

PREPARATION OF SUBSTANTIALLY POLYCRYSTALLINE SILICON CARBIDE FIBERS FROM POLYORGANOSILOXANES

This application is a continuation of U.S. application Ser. No. 449,709, filed Dec. 12, 1989, now abandoned.

BACKGROUND OF THE INVENTION

This invention relates to the preparation of substantially polycrystalline ceramic fibers from preceramic polymeric precursors, and more particularly to the incorporation of boron into fibers formed from polyorganosiloxane resins to produce high temperature stable silicon carbide fibers.

In recent years ceramic materials have been developed for uses requiring good mechanical strength at high temperatures. Silicon carbide is one such ceramic material which possesses desirable high temperature properties. For example, fibers of silicon carbide have been used as a reinforcing material in composite materials such as fiber reinforced metals and fiber reinforced ceramics. However, the hardness and high temperature properties of silicon carbide make it difficult to fabricate and work with so that various methods of fabrication have been developed depending on the desired form of the final article to be produced.

Many different processes have been used in attempts to manufacture silicon carbide fibers. Some have used inorganic silicon carbide powders as the starting material. However, those processes are useful only for the production of relatively large diameter fibers (approximately 70 micrometers and larger). Smaller diameter fibers are more desirable because they are more flexible, can be woven, and provide better reinforcement of metal and ceramic matrix materials.

Where it is desired to produce small diameter fibers of silicon carbide, one method which has been used is to spin an organosilicon polymer into a fiber. The fiber is then infusibilized to render it nonmelting (typically by air treatment at somewhat elevated temperatures) followed by pyrolysis at high temperatures to produce a ceramic fiber.

A problem in the preparation of silicon carbide fibers by the above method is that substantial amounts of oxygen and or nitrogen may either already be present in or introduced into the fibers during spinning, infusibilization, or ceramification. The presence of this oxygen and/or nitrogen adversely affects the thermal stability of the fibers. That is, as the fibers are ceramified at high temperatures, the oxygen and/or nitrogen present in the fibers leaves the fibers, causing weight losses, porosity, and losses in tensile strength in the fibers. While lower ceramification temperatures may be used to decrease the amount of oxygen and/or nitrogen lost, exposure of such fibers to high temperatures during use results in the same problem of the oxygen and/or nitrogen present in the fibers leaving the fibers, causing weight losses, porosity, and losses in tensile strength in the fibers.

Workers have attempted to minimize the oxygen and/or nitrogen present in ceramics fabricated from organosilicon polymers by using the class of such polymers known as polycarbosilanes (PCS). The polymeric backbone structure of polycarbosilanes consists of only silicon and carbon as opposed to polyorganosiloxanes in which the polymeric backbone structure consists of silicon and oxygen. For example, Yajima et al, U.S. Pat. No. 4,100,233, teaches a process for the production of silicon carbide fibers using polycarbosilanes as a starting material.

Nicalon (trademark), a commercially available silicon carbide containing ceramic fiber based on a polycarbosilane starting material, is produced by the above-described process of fiber spinning, infusibilization, and then high temperature pyrolysis. However, the Nicalon fibers so produced contain significant amounts of oxygen (9–15 % by weight). It is known that Nicalon's mechanical properties degrade at elevated temperatures as low as 1200° C. due to weight losses and porosity as the oxygen and/or nitrogen leaves the fibers.

Some workers have incorporated other elements into silicon carbide-based bodies derived from polycarbosilanes in an attempt to improve the mechanical properties of the bodies. Thus, elements such as boron, titanium, and zirconium have been introduced into preceramic polymers. Yajima et al, U.S. Pat. No. 4,248,814, teaches sintering a polycarbosilane and up to 15% by weight of a borosiloxane polymer to produce a ceramic. Yajima et al, U.S. Pat. No. 4,359,559, teaches the production of a polymetallocarbosilane by mixing a polycarbosilane with a titanium or zirconium containing organometallic compound. Yajima et al, U.S. Pat. No. 4,347,347, teaches the production of a block copolymer of a polycarbosilane and a polymetallosiloxane. Yajima et al, U.S. Pat. No. 4,342,712, teaches the production of titanium, silicon, and carbon-containing ceramic fibers from a block copolymer of a polycarbosilane and a titanoxane. Yajima et al, U.S. Pat. No. 4,152,509, teaches the incorporation of boron into the backbone of a polysiloxane to form a borosiloxane polymer which is then mixed with a powdered silicon carbide and cold pressed into a molded article.

However, the prior art describes problems with the incorporation of these elements (sometimes termed heteroatoms) into the polymer. For example, the synthesis procedures for heteroatom incorporation involve high temperature and pressure reaction conditions. The yields of the resulting polymers are low. Also, the heteroatoms bond to the silicon atoms in the polymer backbone through intermediate oxygen linkages so that increasing amounts of oxygen are present in the polymer. Further, silicon carbide-based fibers so produced are typically composed of extremely fine crystalline grains; heating the fibers to temperatures of 1300° C. or higher causes growth of the grains which results in a decrease in mechanical strength of the fibers. See, Takamizawa et al, U.S. Pat. No. 4,604,367 at column 1.

Takamizawa et al, U.S. Pat. No. 4,604,367, teaches the preparation of an organoborosilicon polymer by mixing an organopolysilane with an organoborazine compound, spinning fibers, and then ceramifying the fibers by heating at temperatures in the range of from "900° to 1800° C.". However, the actual examples in Takamizawa show heating up to only 1500° C., and the tensile strength of the Takamizawa fibers is reported to drop off dramatically when heated to temperatures approaching 1500° C.

Takamizawa et al, U.S. Pat. No. 4,657,991, teaches the formation of ceramic precursors of silicon carbides using a polycarbosilane and an organometallic compound containing boron, aluminum, titanium, or zirconium. The patentee teaches pyrolysis of the polymer at temperatures between about 800° and 1500° C. Pyrolysis temperatures above 1500° C. are taught to decrease the mechanical strength of the resulting fibers due to grain size growth.

However, there are a number of applications for ceramic fiber materials which must be able to withstand exposure to much higher temperatures above 1500° C. while retaining their mechanical strength properties. Thus, there remains a need in the art for thermally stable, small diameter silicon carbide fibers for use in both metal and ceramic matrix composites which can withstand very high temperatures of operation.

SUMMARY OF THE INVENTION

The present invention meets that need by providing a process for the preparation of substantially polycrystalline silicon carbide fibers, and the product produced thereby, which can be fabricated to have a small diameter and which are thermally stable at high temperatures. The process is carried out by initially forming fibers from a preceramic polymeric precursor comprising phenyl-containing polyorganosiloxane resins. The fibers are then infusibilized to render them nonmelting, followed by a pyrolysis step in which the fibers are heated to a temperature in excess of 1600° C. in a nonoxidizing atmosphere to form substantially polycrystalline silicon carbide fibers. The substantially polycrystalline silicon carbide fibers which are formed by the process of the present invention have at least 75% crystallinity, a density of at least about 2.9 gm/cm$^3$, and a very low residual oxygen and/or nitrogen content.

The polymeric precursor or the fibers contain, or have incorporated therein, at least about 0.2% by weight boron. This incorporation of boron may be accomplished either prior to or during formation of the fibers, or during at least one of the infusibilizing or pyrolysis steps of the process. For example, boron may be incorporated directly into the polymeric precursor by reacting the precursor with a boron-containing compound or by mixing the boron-containing compound with the precursor. Alternatively, boron may be incorporated into the polymeric precursor during the infusibilization step by exposing the polymeric precursor to a boron-containing gas. In yet another alternative embodiment, boron may be incorporated into the precursor fibers during the pyrolysis step by exposing the precursor fibers to a boron-containing gas. It is preferred that the boron present be substantially uniformly distributed throughout the fibers.

The polymeric fibers may be formed by any of a number of conventional fiber forming processes. For example, the fibers may be formed by spinning techniques such as melt spinning, wet spinning, or dry spinning. A preferred fiber-forming class of polymers is phenyl-containing polyorganosiloxanes having a degree of substitution of between about 1.0 to 1.5. It has been found that this class of polymers are solids at room temperatures and have softening points which render them readily formable into fibers. Preferably, the phenyl-containing polyorganosiloxanes used in the practice of the present invention have a softening point of less than about 100° C. Such polymers may be readily drawn into fibers having diameters of 100 micrometers or less, and preferably having diameters from about 50 micrometers down to about 10 micrometers.

The fibers are then infusibilized to render them nonmelting by curing and crosslinking them in a conventional manner. For example, the fibers may be cured in air. Alternatively, the fibers may be infusibilized by curing the fibers with gamma irradiation or ultraviolet light. The fibers may also be infusibilized by heating the fibers in an atmosphere containing an acid, such as hydrogen chloride, or a base.

The fibers may also be infusibilized, and at the same time have boron incorporated therein, by curing the fibers in an atmosphere containing a mixture of boron trichloride and ammonia or boron trichloride and an amine. The fibers may also be infusibilized by curing the fibers in an atmosphere containing diborane, or first in an atmosphere containing nitric oxide followed by an atmosphere containing boron trichloride or diborane.

After infusibilization, the fibers are then pyrolyzed by heating them to a temperature in excess of about 1600° C., and preferably at a temperature of about 1800°-1850° C. Temperatures in excess of about 2000° C. are not preferred as there is undesirable grain size growth of the silicon carbide which adversely affects fiber strength. The nonoxidizing atmosphere comprises a gas such as, for example, argon, helium, nitrogen, and mixtures thereof. The time for which the fibers are held at a particular maximum temperature will vary inversely with the temperature. The duration of the pyrolysis treatment should be sufficient to eliminate substantially all oxygen and/or nitrogen from the fibers and to permit boron to diffuse substantially uniformly throughout the fibers, if boron has been added during the pyrolysis stage of the process. For example, where the fibers are heated to about 1800° C., it has been found that that temperature should be maintained for about one hour. Lower pyrolysis temperatures require correspondingly longer treatment times.

Surprisingly, the phenyl-containing polyorganosiloxanes used in the practice of the present invention form temperature stable silicon carbide fibers despite the substantial amount of oxygen present in the initial polymer, and despite the fact that oxygen forms a part of the polymer backbone structure. Through the controlled addition of boron to the polymer, or to the fibers at some point in the process, dense, polycrystalline silicon carbide fibers are formed which exhibit improved mechanical strengths at high operating temperatures above about 900° C. If boron is not present in the fiber during the high temperature stage (i.e., 1600° C.) of the pyrolysis, the fibers lose their shape and have very low strength.

Accordingly, it is an object of the present invention to provide a process for the preparation of substantially polycrystalline silicon carbide fibers, and the product produced thereby, which can be fabricated to have a small diameter and which are thermally stable at high temperatures. This, and other objects and advantages of the present invention, will become apparent from the following detailed description, the accompanying drawings, and the appended claims.

DETAILED DESCRIPTION OF THE PREFERRED EMBODIMENTS

Figure 1:
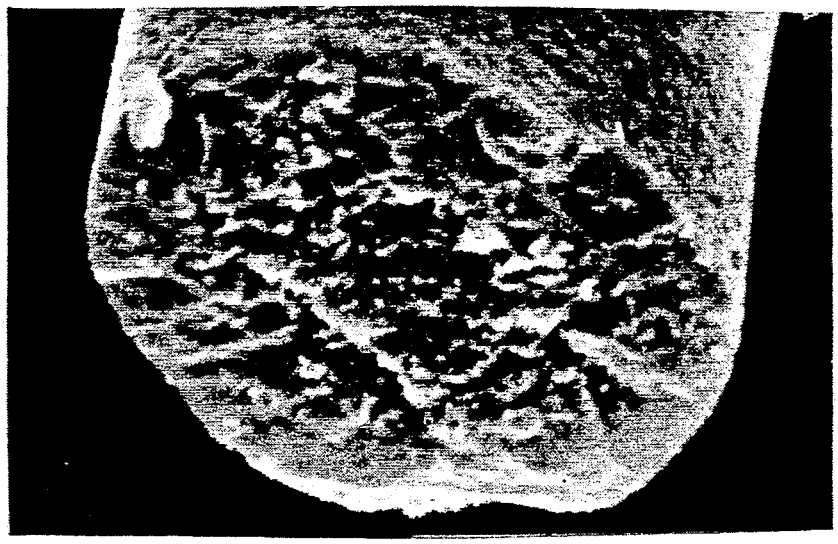
FIG. 1 is a photomicrograph taken with a scanning electron microscope of a polyorganosiloxane derived fiber produced by the process of the present invention containing boron after pyrolysis to 1850° C. for 1 hour in argon atmosphere (15,000× magnification)

The polymeric precursor compositions which are used in the practice of the present invention are selected from the class of polyorganosiloxane resins which contain phenyl groups and which have a degree of substitution of between about 1.0 to 1.5. Such polymers are typically solids at room temperature, can be readily spun into small diameter fibers, can be rendered infusible such that the polymer will remain in fiber form during pyrolysis, and when pyrolyzed produce a ceramic composition in which the carbon to silicon ratio is roughly 1 to 1.

Preferably, the resins are solids at room temperature, but have softening points which render them readily extrudable for conventional fiber spinning techniques such as melt spinning. Preferred softening temperatures for such compositions are less than about 100° C. This permits the polymers to be spun at temperatures of between about 100°–115° C. Alternatively, the polyorganosiloxanes may be liquids which can be spun into fibers and then be solidified by rapid curing upon exiting the spinning apparatus.

The polyorganosiloxanes may be formed into fibers by any of a number of conventional spinning techniques such as melt spinning, dry spinning, or wet spinning. After spinning, the fibers are drawn to very small diameters of about 100 micrometers, and preferably from about 50 micrometers down to about 10 micrometers. These small diameters provide ceramic fibers which are more readily woven into reinforcing matrices for composite materials.

The phenyl-containing polyorganosiloxanes useful in the practice of the present invention preferably contain from about 40–70% by weight $PhSiO_{3/2}$, from about 30–50% by weight $RSiO_{3/2}$, where R is methyl or an aliphatic group including propyl, and from 0–20% by weight $R''R'SiO$, where $R''$ is methyl, an aliphatic group, or phenyl, and $R'$ is phenyl. The phenyl-containing polyorganosiloxanes also preferably contain from about 3–6% by weight OH groups as silanol (SiOH) groups and have a molecular weight in the range of from about 1000–1500. It has been found that the presence of silanol groups in the polymer resin improves the viscosity of the resin during melt spinning. While it is preferred to use a melt spinning process to form the fibers, any other conventional spinning process may also be utilized. For example, the fibers may be formed by spinning techniques such as wet spinning or dry spinning.

The polymeric precursor or the fibers contain, or have incorporated therein, at least about 0.2% by weight boron, and most preferably at least about 0.6% by weight boron. Also, it is desirable that the boron present in the fibers be substantially uniformly distributed throughout the fibers. This incorporation of boron may be accomplished either prior to or during formation of the fibers or during at least one of the infusibilizing step or the initial heating period of the pyrolysis. For example, boron may be incorporated directly into the polymeric precursor by reacting the precursor with a boron-containing compound or by mixing a boron-containing compound with the precursor. Thus, the aforementioned Yajima et al, U.S. Pat. No. 4,152,509, teaches the incorporation of boron into the backbone of a polyorganosiloxane resin by a polycondensation reaction. Other known reaction procedures may also be used to incorporate boron into the polymeric precursor.

Alternatively, boron may be incorporated into the polymeric precursor during the infusibilization step by exposing the polymeric precursor to a boron-containing gas. This may be accomplished at relatively low temperatures of between about 50° to about 200° C. and below the softening point of the polymeric precursor. For example, the polymeric precursor may be exposed to a diborane-containing gas which diffuses into the surface of the polymeric precursor fibers and through to their cores and deposits boron therein. A diborane concentration of from about 0.01 to about 1.0% by volume in an otherwise inert gas such as argon has been found to provide an atmosphere which will cure (infusibilize) the polymeric precursor while incorporating the desired concentrations of boron into the fibers. Cure times should be sufficient to permit the boron to diffuse substantially uniformly throughout the fibers to provide concentration levels of at least 0.2% by weight.

While the use of higher temperatures provide faster curing of the polymer, it is desired to maintain the integrity of the fibers during cure. Accordingly, the softening point of the polymer should not be exceeded during infusibilization. However, it has been found that as the cure proceeds, the softening temperature of the polymeric precursor increases so that the curing temperature may be raised as the polymer cures.

Alternatively, the polymeric precursor fibers may be infusibilized by sequential exposure to a boron containing gas such as boron trifluoride, boron tribromide, or boron trichloride and then to an amine such as ammonia at temperatures in the range of from about 25° to about 200° C. Preferably, both the boron containing gas and amine gases are diluted with an otherwise inert gas such as argon or nitrogen. It is preferred that the boron containing gas concentration in the curing atmosphere be in the range of from about 10 to about 30% by volume, while the amine is present in the range of from about 1 to about 15% by volume.

Again, it is preferred to heat the fibers slowly so that their softening temperature is not exceeded. However, as the cure proceeds, the softening temperature of the polymer will rise, and the curing temperature can also be increased accordingly as the cure proceeds. The cure times should be sufficient to permit the boron to diffuse into the fibers and be substantially uniformly distributed therein to the desired concentration levels. Cure times in the range of from 4 to about 24 hours have been found to be adequate. Of course, optimum curing times depend on not only the polymer treated, but also the diameter of the fibers and the concentration of boron in the curing atmosphere.

In yet another alternative embodiment of the invention, the polymeric precursor fibers may be cured by exposure first to an atmosphere containing nitric oxide followed by exposure to an atmosphere containing boron trichloride or diborane. Nitric oxide concentrations in the range of from about 1 to about 10% by volume in an otherwise inert gas such as argon have been found to be useful when followed sequentially by exposure of the fibers to an atmosphere containing either boron trichloride or diborane. A general description of the nitric oxide cure process is contained in U.S. Pat. No. 4,847,027, the disclosure of which is incorporated by reference.

Again, exposure of the fibers to the boron-containing atmosphere is carried out at temperatures below the softening temperatures of the fibers. It has been found that temperatures in the range of from about 25° to about 200° C. may be used. Increasing the temperature over time as the cure proceeds speeds up the curing process. Total cure times of from bout 4 to about 24 hours may be used.

In still another embodiment of the invention, boron may be incorporated into the polymeric precursor during the initial stages of the pyrolysis process, such as during the time that the fibers are being heated up to the temperature at which pyrolysis begins and the polymer composition converts to a ceramic composition. For example, incorporation of boron into the precursor polymer fibers can be effected by diffusion of a boron containing gas such as diborane into the infusibilized fibers.

Typically, pyrolysis becomes significant at about 400° C. so that as the polymer is subjected to temperatures above about 400° C., the incorporation of boron becomes increasingly difficult. Accordingly, if boron is incorporated after the infusibilizing step, it is preferred to treat the fibers with a boron containing gas at a temperature below about 400° C. for a time sufficient for the desired amount of boron containing gas to diffuse into the fibers. In this embodiment of the invention, the infusibilization stage of the process may be used for curing the polymeric precursor fibers without the need to incorporate boron into the fibers at that stage. However, it is within the scope of this invention to incorporate boron into the fibers at any or all of the stages of the process.

For those instances where a conventional cure is used to infusibilize the fibers, any of a number of processes may be utilized. For example, the fibers may be cured in air during heating. Alternatively, the fibers may be infusibilized by curing the fibers with gamma irradiation or ultraviolet light. The fibers may also be infusibilized by heating the fibers in an atmosphere containing an acid, such as hydrochloric acid, or a base such as ammonia or an amine.

After infusibilization, the fibers are then pyrolyzed by heating them to a temperature in excess of about 1600° C., and preferably at a temperature of about 1800°–1850° C. It has been found that both oxygen and nitrogen are eliminated from the fibers at temperatures above about 1400° C. However, the best densification, modulus improvement, and stability when the fibers are subsequently exposed to high temperatures are achieved when the fibers are pyrolyzed at temperatures in excess of about 1600° C.

As mentioned above, boron may be incorporated into the fibers during the early stages of pyrolysis by exposing the fibers to an atmosphere containing a boron-containing gas. For example, the fibers may be exposed to an atmosphere containing diborane, or other boron hydrides such as tetraborane, pentaborane, or the like. Other boron-containing compounds such as borazine or trichloroborazine may also be used if the temperatures of the atmosphere are such that these compounds are vaporized and present in gaseous form.

Again, the concentration of the boron-containing compound in the atmosphere may be small. For example, if diborane is used, workable concentrations are in the range of from about 0.01 to about 1.0% by volume of the atmosphere. Again, inert gases such as argon or helium may be used to make up the remainder of the atmosphere. Temperatures at which significant amounts of boron are deposited and diffuse into the fibers range from about 50° to about 500° C. The times for exposure to the boron-containing gaseous atmosphere may vary based on the diameter of the fibers, the concentration of the boron-containing gas in the atmosphere, and the temperatures used. Typical exposure times are in the range of from about 1 to about 24 hours.

At pyrolysis temperatures above about 1400° C., nitrogen-containing atmospheres are not preferred as nitrogen is not inert to the fibers under those temperature conditions. At high temperatures, truly inert gaseous atmospheres are preferred such as argon and/or helium. Pyrolysis temperatures in excess of about 2000° C. are not preferred as there is undesirable grain size growth of the silicon carbide ceramic which forms which adversely affects fiber strength.

The time for which the fibers are held at a particular maximum temperature will vary inversely with the temperature. The duration of the pyrolysis treatment should be sufficient to reduce oxygen and/or nitrogen content of the fibers to below about 0.2 weight % and to permit boron to diffuse substantially uniformly throughout the fibers, if boron has been added during the pyrolysis stage of the process. For example, where the fibers are heated to about 1800° C., it has been found that that temperature should be maintained for about one hour. Lower pyrolysis temperatures require correspondingly longer treatment times.

The ceramic fibers which result from the process of the present invention have at least 75% crystallinity and have a density of at least about 2.9 gm/cc, which represents about 90–95% of theoretical density. The photomicrograph of FIG. 1 illustrates the appearance of a phenyl-containing polyorganosiloxane fiber after boron incorporation and pyrolysis at 1850° C. for one hour. The presence of boron distributed substantially uniformly throughout the fiber produces a dense fiber having a relatively smooth surface structure and relatively fine grain sizes.

The silicon carbide fibers produced by the practice of the process of the present invention possess extremely fine grained structures having grain sizes of less than about 0.5 micrometers (less than about 500 nanometers), and typically in the range of about 200 nanometers. Virtually all of the oxygen and/or nitrogen originally present in, or introduced into, the fibers is removed by the high temperature pyrolysis step. Less than about 1%, and preferably less than about 0.5%, by weight oxygen and/or nitrogen remain.

Figure 2:
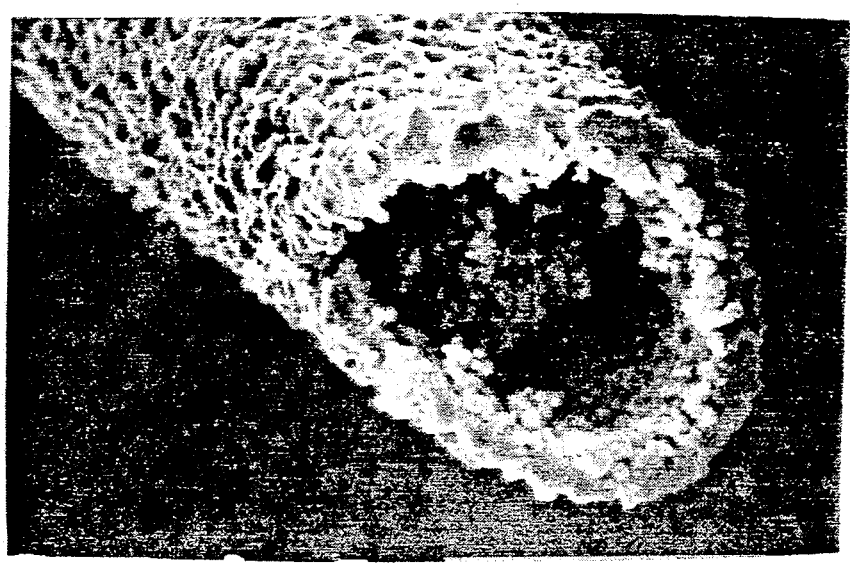
FIG. 2 is a photomicrograph taken with a scanning electron microscope of a polyorganosiloxane derived fiber produced by the same process as the fiber of FIG. 1 except that no boron was incorporated into the fiber (10,000× magnification).

By comparison, fibers treated in a similar manner, including high temperature pyrolysis but without boron incorporation, become porous, weakened mechanically, and coarse grained as illustrated by the photomicrograph of FIG. 2. It is believed that this porosity and weakening of mechanical strength occurs upon loss of gases containing CO, SiO, and $N_2$ (if N is present) during pyrolysis and concurrent crystallization.

In order that the invention may be more readily understood, reference is made to the following examples, which are intended to illustrate the invention, but are not to be taken as limiting the scope thereof.

EXAMPLE 1

A phenyl-containing polyorganosiloxane resin containing about 28% methyl $SiO_{3/2}$ groups, 48% phenyl $SiO_{3/2}$ groups, 18% diphenyl SiO groups, and 6% phenyl methyl SiO groups, where all percentages reported are by weight, was selected for spinning into fibers. The resin was solid at room temperature, had a $T_g$ of approximately 50°-55° C., and had a molecular weight of approximately 1200. The resin comprised about 95% by weight siloxane groups and about 5% by weight silanol groups.

The resin was heated to 105°-115° C. in a laboratory monofilament spinning unit with an orifice diameter of 0.010 inch and extruded at from 0.02-0.036 gm/min in six separate runs. The take up speed of the fiber on the reel was 145-200 meters/min, and fibers were obtained having diameters from about 12-18 micrometers. The fibers were exposed to an atmosphere containing boron trichloride in argon during spinning. This was followed by heating the fibers gradually to a temperature of about 150° C. while exposing the fibers to an ammonia in nitrogen atmosphere.

EXAMPLE 2

A phenyl-containing polyorganosiloxane resin containing about 76% by weight phenyl $SiO_{3/2}$ groups and 24% by weight n-propyl $SiO_{3/2}$ groups was selected for spinning into fibers. The resin was solid at room temperature, had a $T_g$ of approximately 50°-55° C., and had a molecular weight of approximately 1200. The resin comprised about 95% by weight siloxane groups and about 5% by weight silanol groups. The resin was spun into fibers using a laboratory monofilament spinning unit as in Example 1 at a spinning temperature of about 100° C., an extrusion rate of 0.036 gm/min, and a take up reel speed of 145 meters/min.

EXAMPLE 3

The phenyl-containing polyorganosiloxane resins of Example 1 and 2 were blended in a 50/50 weight mixture and spun into fibers at 110° C. Fibers having diameters of 13-14 micrometers were obtained by extruding the resin blend at 0.020 gm/min and taking up the fibers on a reel at 145 meters/min. The fibers were exposed to a boron trichloride in argon atmosphere during spinning. The fibers were then exposed to an ammonia in nitrogen atmosphere during gradual heating to 150° C., followed by pyrolysis at 800° C.

EXAMPLE 4

Fibers obtained during spinning of the phenyl-containing polyorganosiloxane resin of Example 1 and which had been exposed while spinning to a boron trichloride in argon atmosphere were further cured with boron by exposing them to an argon atmosphere containing 0.2% by volume diborane. The fibers were maintained at room temperature for 30 minutes followed by heating to 200° C. at 1 degree C./min increments, and with 30 minute temperature holds at 45° and 55° C.

Exposure to diborane was then halted, and heating was continued at 3° C./min to 1200° C. to pyrolyze the fibers. This procedure produced a 71.3% ceramic yield of a material which was still fibrous. A portion of those fibers was then heated to and held at 1850° C. for one hour under an argon atmosphere in a graphite resistance furnace. During the pyrolysis treatment, the fibers lost 60.2% of their weight and all but 0.12% of their oxygen. This compared to a typical oxygen content in non-boron treated siloxane-derived ceramic fibers of 25-30%.

The ceramic material remained fibrous, and at least as separable as the non-boron treated ceramic fiber. Density, as measured by a sink/float technique, was 2.93-3.03 gm/cm³. A photomicrograph was taken with a scanning electron microscope and is shown as FIG. 1. As can be seen, the fibers were intact except for a somewhat grainy core which is believed to be due to low boron content at the core. In the outer portions of the fiber, graininess was undetectable (<0.1 micrometer grain size). Further analysis established the fibers to be greater than 90% crystalline beta silicon carbide with a crystallite size of 400 angstroms.

For comparison purposes, the same polyorganosiloxane resin was spun into fibers. The fibers were then cured by exposure to hydrogen chloride during spinning followed by exposure to ammonia in a batch post cure after spinning. The fibers were then pyrolyzed by heating them at the rate of 3° C. per minute in argon to a temperature of 1200° C. The fibers were then reheated to 1800° C. in argon, with a one hour hold at that temperature.

No boron was added to these fibers at any stage of the process. A photomicrograph was taken with a scanning electron microscope and is shown as FIG. 2. As can be seen, the cores of the fibers are grainy and porous. The cores are surrounded by thin, relatively nonporous shells. However, even this portion of the fibers appears to contain large scale graininess. Final fiber strength was negligible.; the fibers crumbled at a touch. As can be seen, the silicon carbide fibers synthesis process does not yield a useful fiber product in the absence of boron.

While certain representative embodiments and details have been shown for purposes of illustrating the invention, it will be apparent to those skilled in the art that various changes in the methods disclosed herein may be made without departing from the scope of the invention, which is defined in the appended claims.

What is claimed is:

1. A process for the preparation of substantially polycrystalline silicon carbide fibers comprising the steps of:
    a) forming fibers from a preceramic polymeric precursor consisting essentially of phenyl-containing polyorganosiloxane resins;
    b) infusibilizing said fibers; and
    c) pyrolyzing said fibers at a temperature in excess of 1600° C. in a nonoxidizing atmosphere to form substantially polycrystalline silicon carbide fibers; said fibers having incorporated therein at least about 0.2% by weight boron during either or both of said infusibilizing and pyrolyzing steps.

2. The process of claim 1 in which said substantially polycrystalline silicon carbide fibers have at least 75% crystallinity.

3. The process of claim 1 in which said substantially polycrystalline silicon carbide fibers have a density of at least about 2.9 gm/cm³.

4. The process of claim 1 in which said fibers formed in step a) are formed by spinning.

5. The process of claim 4 in which said fibers formed in step a) are formed by melt spinning.

6. The process of claim 4 in which said fibers formed in step a) are formed by wet spinning.

7. The process of claim 4 in which said fibers formed in step a) are formed by dry spinning.

8. The process of claim 1 in which said phenyl-containing polyorganosiloxanes have a degree of substitution of between about 1.0 to 1.5.

9. The process of claim 8 in which said phenyl-containing polyorganosiloxanes have a softening temperature of less than about 100° C.

10. The process of claim 1 in which said fibers are infusibilized by curing said fibers in air.

11. The process of claim 1 in which said fibers are infusibilized by curing said fibers in an atmosphere containing a mixture of boron trichloride and ammonia or amine.

12. The process of claim 1 in which said fibers are infusibilized by curing said fibers in an atmosphere containing diborane.

13. The process of claim 1 in which said fibers are infusibilized by curing said fibers with gamma irradiation.

14. The process of claim 1 in which said fibers are infusibilized by curing said fibers with ultraviolet light.

15. The process of claim 1 in which said fibers are infusibilized by curing said fibers first in an atmosphere containing nitric oxide followed by curing said fibers in an atmosphere containing boron trichloride or diborane.

16. The process of claim 1 in which said fibers are infusibilized by curing said fibers by heating said fibers in an atmosphere containing an acid or a base.

17. The process of claim 1 in which said fibers are infusibilized by curing said fibers by heating said fibers in an atmosphere containing hydrogen chloride.

18. The process of claim 1 in which said nonoxidizing atmosphere comprises a gas selected from the group consisting of argon, helium, and mixtures thereof.

19. The process of claim 1 in which said pyrolysis step includes heating said fibers to about 1800° C. and maintaining that temperature for about one hour.

20. The process of claim 1 in which boron is incorporated into said fibers during said infusibilization step by exposing said polymeric precursor to a boron-containing gas.

21. The process of claim 1 in which boron is incorporated into said fibers during said pyrolyzing step by exposing said polymeric precursor to a boron-containing gas.

22. A process for the preparation of substantially polycrystalline silicon carbide fibers comprising the steps of:
   a) forming fibers from a preceramic polymeric precursor consisting essentially of phenyl-containing polyorganosiloxane resins which have incorporated therein at least about 0.2% by weight boron therein either prior to or during the formation of the fibers;
   b) infusibilizing said fibers; and
   c) pyrolyzing said fibers at a temperature in excess of 1600 degrees C. in a nonoxidizing atmosphere to form substantially polycrystalline silicon carbide fibers.

23. The process of claim 22 in which said substantially polycrystalline silicon carbide fibers have at least 75% crystallinity.

24. The process of claim 22 in which said substantially polycrystalline silicon carbide fibers have a density of at least about 2.9 gm/cm$^3$.

25. The process of claim 22 in which said fibers formed in step a) are formed by spinning.

26. The process of claim 25 in which said fibers formed in step a) are formed by melt spinning.

27. The process of claim 25 in which said fibers formed in step a) are formed by wet spinning.

28. The process of claim 25 in which said fibers formed in step a) are formed by dry spinning.

29. The process of claim 22 in which said phenyl-containing polyorganosiloxanes have a degree of substitution of between about 1.0 to 1.5.

30. The process of claim 29 in which said phenyl-containing polyorganosiloxanes have a softening temperature of less than about 100 degrees C.

31. The process of claim 22 in which said fibers are infusibilized by curing said fibers in air.

32. The process of claim 22 in which said fibers are infusibilized by curing said fibers in an atmosphere containing a mixture of boron trichloride and ammonia or amine.

33. The process of claim 22 in which said fibers are infusibilized by curing said fibers in an atmosphere containing diborane.

34. The process of claim 22 in which said fibers are infusibilized by curing said fibers with gamma irradiation.

35. The process of claim 22 in which said fibers are infusibilized by curing said fibers with ultraviolet light.

36. The process of claim 22 in which said fibers are infusibilized by curing said fibers first in an atmosphere containing nitric oxide followed by curing said fibers in an atmosphere containing boron trichloride or diborane.

37. The process of claim 22 in which said fibers are infusibilized by curing said fibers by heating said fibers in an atmosphere containing an acid or a base.

38. The process of claim 22 in which said fibers are infusibilized by curing said fibers by heating said fibers in an atmosphere containing hydrogen chloride.

39. The process of claim 22 in which said nonoxidizing atmosphere comprises a gas selected from the group consisting of argon, helium, and mixtures thereof.

40. The process of claim 22 in which said pyrolysis step includes heating said fibers to about 1800 degrees C. and maintaining that temperature for about one hour.

* * * * *